(12) United States Patent
Li

(10) Patent No.: US 9,041,304 B2
(45) Date of Patent: May 26, 2015

(54) CURRENT CONTROL CIRCUIT AND ASSOCIATED METHOD

(75) Inventor: Taofeng Li, Chengdu (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 0 days.

(21) Appl. No.: 13/529,481

(22) Filed: Jun. 21, 2012

(65) Prior Publication Data

US 2012/0326615 A1    Dec. 27, 2012

(30) Foreign Application Priority Data

Jun. 21, 2011    (CN) .......................... 2011 1 0166613

(51) Int. Cl.
*H05B 37/00* (2006.01)
*H05B 33/08* (2006.01)

(52) U.S. Cl.
CPC ........ *H05B 33/0824* (2013.01); *H05B 33/0809* (2013.01)

(58) Field of Classification Search
USPC .................... 315/200 R, 169.3, 307, 58, 167; 327/552, 100, 172, 79; 365/230.03
See application file for complete search history.

(56) References Cited

U.S. PATENT DOCUMENTS

2012/0153844 A1* 6/2012 Chobot ..................... 315/185 R

* cited by examiner

*Primary Examiner* — Sue A Purvis
*Assistant Examiner* — Jae Kim
(74) *Attorney, Agent, or Firm* — Perkins Coie LLP

(57) ABSTRACT

A current control circuit and associated method are disclosed hereby. The current control circuit has a fly-wheel circuit, comprising an inductor, a rectifier and a load; a current sense circuit, detecting a load current, configured to generate a first current signal; a compensating circuit, generating a compensating signal; a control circuit, generating a control signal according to the first current signal and the compensating signal; a first switch, coupled to the fly-wheel circuit, turned ON and OFF according to the control signal. By the effect of the compensating signal, the drift error of the average load current is prohibited.

9 Claims, 7 Drawing Sheets

US 9,041,304 B2

CURRENT CONTROL CIRCUIT AND ASSOCIATED METHOD

CROSS-REFERENCE TO RELATED APPLICATION(S)

This application claims the benefit of CN application No. 201110166613.9, filed on Jun. 21, 2011, and incorporated herein by reference.

TECHNICAL FIELD

The present invention generally relates to electric circuit, and more particularly but not exclusively relates to a current control circuit and associated method.

BACKGROUND

In electric circuit, precise current, especially precise average current, is commonly required to be provided to load. The term "load" hereby includes but not limited to electrical load, battery, and light-emitting diode (LED), etc. Among these loads, the precision control of LED current, especially LED average current, is particularly important. LED current control circuit is applied as an example to introduce the related technology in the following text.

It is well-known that the luminance of LED depends on the average current flowing through the LED. The average current of LED may be set by a current control circuit. FIG. 1 illustrates a LED current control circuit 100, comprising: an input voltage terminal $V_{IN}$, a switch terminal SW, and a reference ground terminal GND; a fly-wheel circuit 101 comprising an inductor L, a load of LED string and a rectifier coupled in series, wherein the LED string comprises a plurality of LEDs D1-DN, the LED string is further coupled to the input voltage terminal $V_{IN}$ through a sampling resistor $R_{SENSE}$, and rectifier Rectifier is coupled between the input voltage terminal $V_{IN}$ and the switch terminal SW; a current sense circuit 102 comprising a first resistor R1, a first error amplifier EA1 and a first transistor T1, wherein current sense circuit 102 senses the current flowing through the LED string, and generates a first current signal $I_{FIRST}$ accordingly; a first reference signal REF; a control circuit 103 comprising a second resistor R2, a third resistor R3, a second switch M2, a first comparator C1 and a driver D1, responsive to the first current signal $I_{FIRST}$ and the first reference signal REF, operable to generate a control signal $V_{CON}$; and a switch M1, coupled between the switch terminal SW and the reference ground terminal GND, turned ON and OFF according to the control signal.

As shown in FIG. 2, when the first switch M1 is turned on (the voltage $V_{SW}$ on the SW terminal is at low level), a loop comprising the input voltage terminal $V_{IN}$, the inductor L, the load, the switch M1 and the reference ground terminal GND is conducted. The current flowing through the LED string (inductor current $I_L$) gradually increases. By the effect of the current sense circuit 102, $I_{SENSE}$ also gradually increases, and the voltage level on a node B rises up. At this moment, the second switch M2 is turned ON, and the voltage drop on the third resistor R3 and the second switch M2 may be ignored. When the voltage level on node B reaches $V_{REF}$ (the voltage level of REF signal), that is, $I_{FIRST}$ reaches $V_{REF}/R2$, the first comparator C1 is reversed and generates a low level output signal. The first switch M1 and the second switch M2 are turned OFF (the voltage $V_{SW}$ on the SW terminal is at high level), and the LED string, inductor L, rectifier Rectifier comprises a current loop. The current on the LED load decreases gradually. By the effect of current sense circuit 102, $I_{FIRST}$ also gradually decreases, and the voltage level on node B falls down. When the voltage level on node B falls to $V_{REF}$, that is, the current $I_{FIRST}$ decreases to $V_{REF}/(R2+R3)$, the comparator P2 is reversed to generate a high level output signal. $I_{FIRST}$ oscillates between a hysteresis voltage [$V_{REF}/(R2+R3)$, $V_{REF}/R2$], and correspondingly the inductor current $I_L$ oscillates between the hysteresis voltage [$V_{REF}/(R2+R3)$, $V_{REF}/R2$].

Supposing the duty cycle D of the first switch M1 is 50%, when $I_{FIRST}$ reaches the high level peak of the hysteresis voltage $V_{REF}/R2$, it takes some time for the system to control the switch M1 ON and OFF. Seen in FIG. 2, the $T_{D1}$ and $T_{D2}$ are respectively the propagation delay time of the first comparator C1 and the delay time of the driver circuit. $T_{D1}$ represents the period from the moment when $I_{FIRST}$ reaching $V_{REF}/(R2+R3)$ to the moment when the switch M1 is turned ON, while $T_{D2}$ represents the period from the moment when $I_{FIRST}$ reaching $V_{REF}/R2$ to the moment when the switch M1 is turned OFF. $\Delta I_{TH1}$ and $\Delta I_{TH2}$ are respectively the output current error caused by delays $T_{D1}$ and $T_{D2}$. When the duty cycle D is 50%, if $T_{D1}=T_{D2}$, then $\Delta I_{TH1}=\Delta I_{TH2}$. As a result, the average current flowing through inductor L is still precise.

The variation of input voltage or the number of serially coupled LEDs may lead to the change of duty cycle D. As shown in FIG. 3, supposing the duty cycle D is 10%, it may approximately consider that the up-time of the inductor current is 1/9 of the down time of the inductor current. Thus the current rising rate is 9 times more than the current falling rate. Once $T_{D1}=T_{D2}$, then $\Delta I_{TH1}=9\times\Delta I_{TH2}$. Thus, when the duty cycle D is smaller than 50%, the average inductor current $I_L$ may drift to $I_{TH1}$ and generate an error, so that the average inductor current is higher than the desired value. On the contrary, when the duty cycle D is larger than 50%, the average inductor current $I_L$ may drift to $I_{TH2}$ and also generate an error, so that the average inductor current $I_L$ is smaller than the desired value.

Besides the above description, the reasons of generating an error further include but not limited to: the delay, delay difference under different load/inductor current, or non-linearity of current sense circuit 102; the delay, non-linearity or delay difference between rising-edge and falling-edge of control circuit 103; the delay, non-linearity or difference between rising-edge and falling edge of the driver circuit; the varying of the above delays, delay difference or non-linearity caused by the change of duty cycle.

SUMMARY

One embodiment of the present invention discloses a current control circuit system to provide a precise load current, especially a precise average load current. The current control circuit system comprises: a fly-wheel circuit comprising an inductor, a rectifier and a load, wherein the inductor and the load are coupled in series; a current sense circuit having an input terminal and an output terminal, wherein the input terminal is coupled to the fly-wheel circuit and wherein the output terminal is configured to provide a first current signal indicating a load current flowing through the load; a compensating circuit having an output terminal configured to provide a compensating signal; a control circuit, having an input terminal and an output terminal, wherein the input terminal is coupled to the output terminal of the current sense circuit and the output terminal of the compensating circuit, and the output terminal of the control circuit is configured to provide a control signal according to the first current signal and the compensating signal; and a first switch comprising a first terminal, a second terminal and a control terminal, wherein the first terminal is coupled to the fly-wheel circuit, the second terminal is coupled to a reference ground and control terminal is coupled to the output of the control circuit, and wherein the first switch is configured to be turned ON and OFF according to the control signal.

By introducing the compensating circuit and the compensating signal into the current control circuit, the drift error of the average load current may be prohibited.

BRIEF DESCRIPTION OF THE DRAWINGS

Non-limiting and non-exhaustive embodiments are described with reference to the following drawings. The drawings are not depicted to scale and only for illustration purpose.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
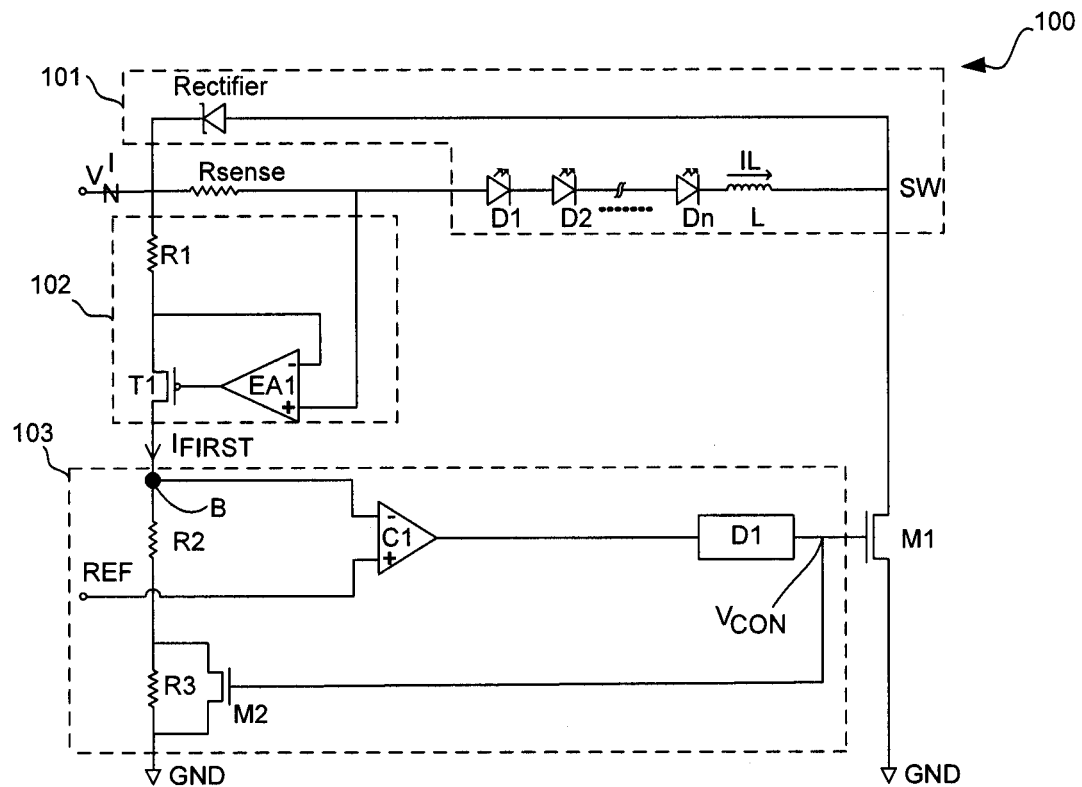
FIG. 1 illustrates a prior art LED current control circuit system 100.
Figure 2:
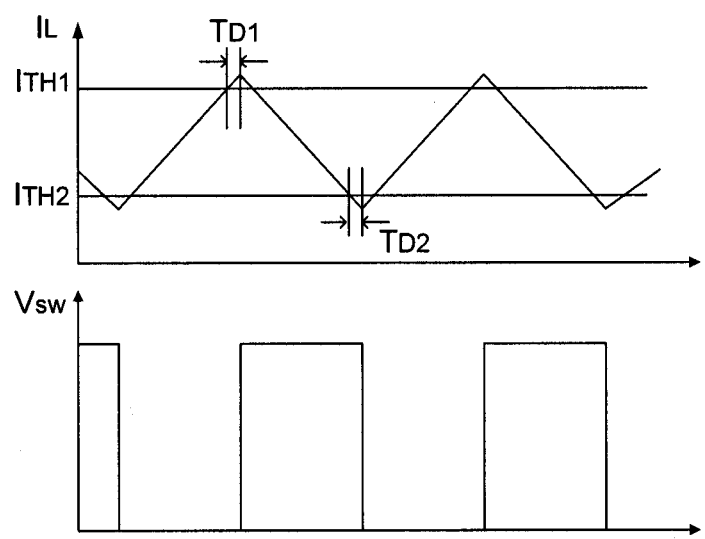
FIG. 2 illustrates a prior art operation waveform diagram of the LED current control circuit system 100 when the duty-cycle is 50%.
Figure 3:
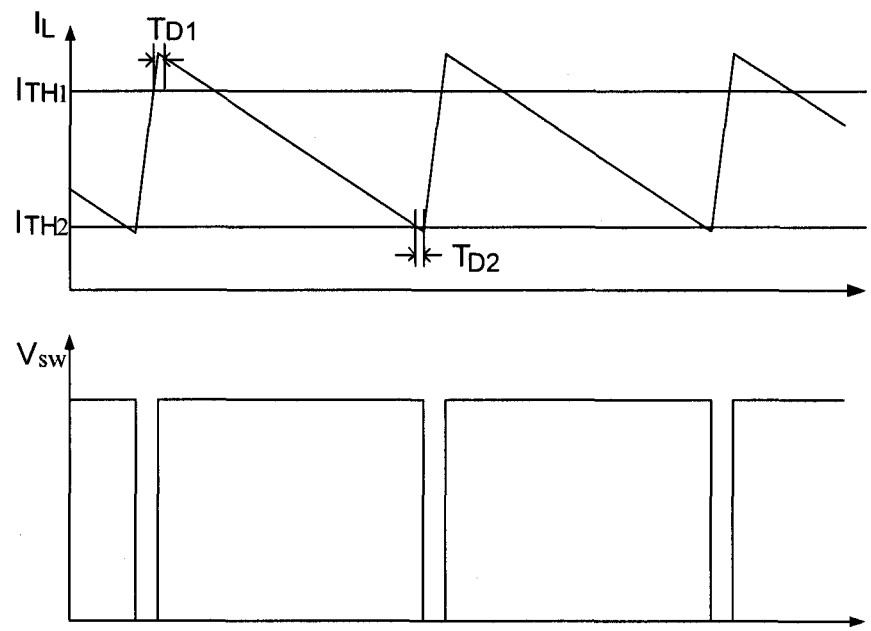
FIG. 3 illustrates a prior art operation waveform diagram of the LED current control circuit system 100 when the duty-cycle is 90%.
Figure 4:
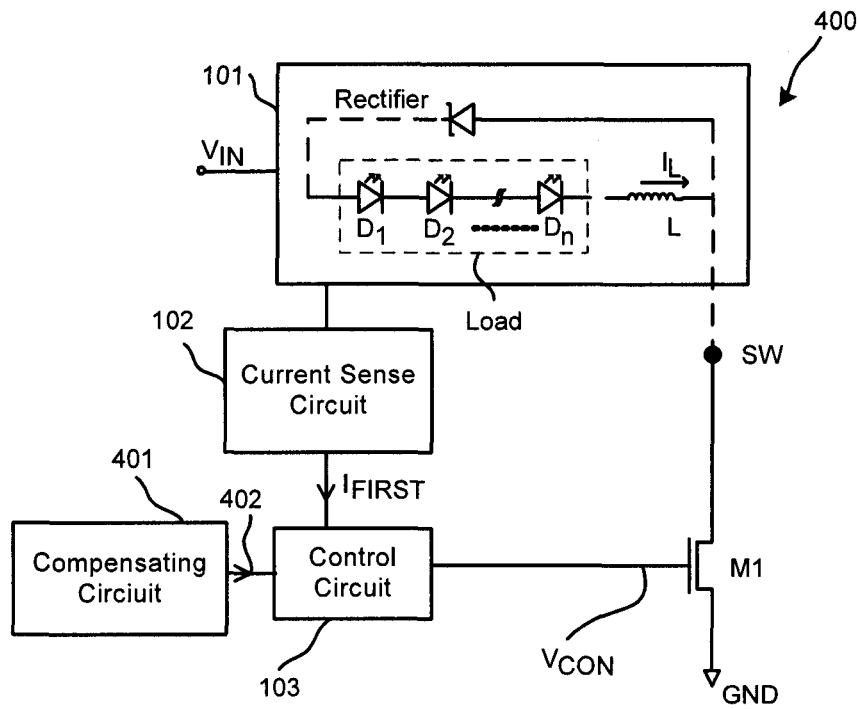
FIG. 4 illustrates a schematic block diagram of a current control circuit system 400 according to an embodiment of the present invention.

FIG. 4 illustrates a schematic block diagram of a current control circuit system 400 according to an embodiment of the present invention. A current control circuit system 600 shown in FIG. 6, a circuit system 800 shown in FIG. 8, and a circuit system 900 shown in FIG. 9, schematically introduce some specific structural embodiments of circuit system 400. As shown in FIG. 4, current control circuit system 400 may comprise: an input voltage terminal $V_{IN}$, a switch terminal SW and a reference ground terminal GND; a fly-wheel circuit 101, comprising an inductor L, a load (D1, D2, . . . Dn) and a rectifier Rectifier, wherein fly-wheel circuit 101 is coupled between the input voltage terminal $V_{IN}$ and the switch terminal SW; current sense circuit 102, detecting the current flowing through the load and the inductor, and generating a first current signal $I_{FIRST}$; a first, reference signal REF; a compensating circuit 401, generating a compensating signal 402; a control circuit 403, generating a control signal $V_{CON}$ according to the first current signal $I_{FIRST}$, compensating signal 402, and maybe further according to first reference signal REF in certain embodiments; and a switch M1, coupled between the switch terminal SW and the reference ground terminal GND, turned ON and OFF according to the control signal $V_{CON}$. One with ordinary skill in relevant art may choose to detect the load current or the inductor current according to different specific applications for generating the first current signal. In one embodiment, load current may be detected. In another embodiment, inductor current may be detected. In yet another embodiment, the current is detected from both the load and the inductor.

In the shown embodiment, the load (D1, D2, Dn) are a LED string. In other embodiments, the load may comprise one LED, or a plurality of LED strings. The type of LED may comprise but not limited to white LED, blue LED, red LED, yellow LED, and etc. In other embodiment, the load may further comprise but not limited to battery, electric load, and etc.

In one embodiment, the rectifier Rectifier may comprise Schottky diode. In other embodiments, P-type or N-type metal-oxide semiconductor field effect transistor (MOSFET) may be applied in the rectifier.

In one embodiment, the load and the inductor L are coupled in series, and then together coupled between the input voltage terminal $V_{IN}$ and the switch terminal SW. The rectifier Rectifier is coupled between the input voltage terminal $V_{IN}$ and the switch terminal SW. In one embodiment, the inductor L is adjacent to switch terminal SW, while in another embodiment, the load is adjacent to switch terminal SW. In other embodiments, the inductor L is coupled among the LED strings. The dash line in FIG. 4 emphasizes a coupling relationship, which represents that the rectifier Rectifier, the load D1-DN and the inductor L may be coupled directly, or indirectly coupled through other device, wire, and etc. Unless particularly or exclusively mentioned, the solid line also represents a coupling relationship but not direct connection relationship.

Figure 6:
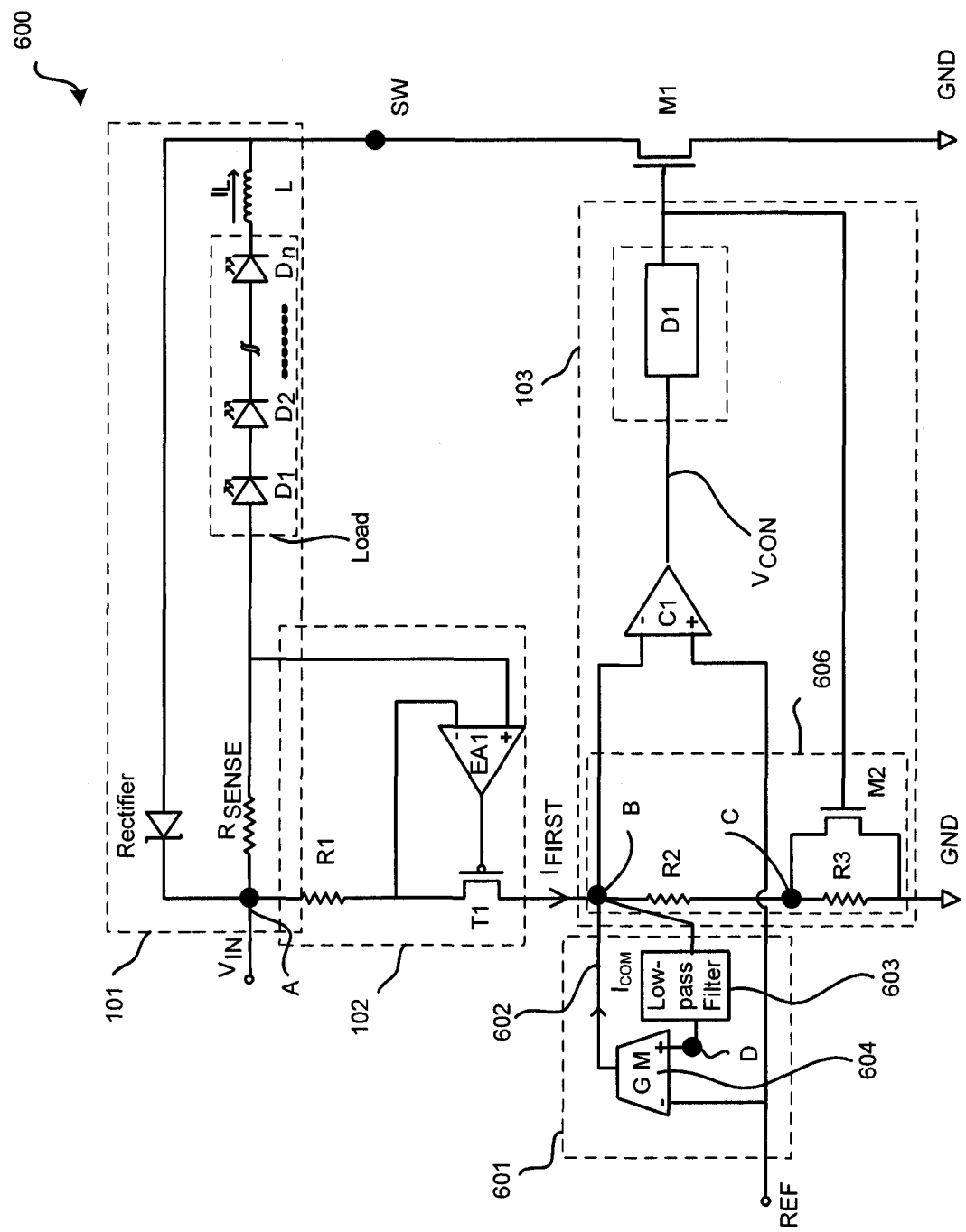
FIG. 6 illustrates a specific circuitry diagram of a current control circuit system 600 according to an embodiment of the present invention.

In one embodiment, the current control circuit system 600 shown in FIG. 6 further comprises a sampling resistor $R_{SENSE}$. The sampling resistor $R_{SENSE}$ is coupled to the load D1-DN or inductor L. The sampling resistor $R_{SENSE}$ may be adjacent to the input voltage terminal $V_{IN}$, or adjacent to the switch terminal SW. The sampling resistor $R_{SENSE}$ may be coupled among the LED strings, or coupled between the LED load and the inductor L. The current sense circuit 102 detects the current flowing through the load by the sampling resistor $R_{SENSE}$. In one embodiment, the sampling resistor $R_{SENSE}$ comprises a first terminal and a second terminal. The current sense circuit 102 comprise as shown in FIG. 6: a first resistor R1, comprising a first terminal and a second terminal, wherein the first terminal is coupled to the first terminal of the sampling resistor $R_{SENSE}$; a first error amplifier EA1, wherein a first input terminal is coupled to the second terminal of the first resistor R1, and wherein a second input terminal is coupled to a second terminal of the sampling resistor $R_{SENSE}$; a first transistor T1, wherein a gate is coupled to an output terminal of the first error amplifier EA1, and wherein a first input terminal is coupled to the second terminal of the first resistor, and further wherein a second input terminal is coupled to the control circuit 103.

In one embodiment, the control circuit 103 has plurality of input terminals and an output terminal. In one embodiment, the control circuit 103 comprises: a hysteresis generator 606, generating a hysteresis voltage on a hysteresis voltage generating node B; a first comparator C1, having a first input terminal, a second input terminal and an output terminal, and wherein the output terminal generates the control signal $V_{CON}$. In certain embodiments, wherein the second terminal is coupled to the first reference signal REF. In some embodiments, the control circuit may further comprise a driver D1, coupled to an output terminal of the first comparator C1, converting the control signal $V_{CON}$ to a driving signal to drive the switch. In one embodiment, the hysteresis generator 606 comprises a second resistor R2; a third resistor R3, coupled to the second resistor R2; a second switch M2, coupled to the third resistor R3 in parallel, controlled by the control signal $V_{CON}$.

According to an embodiment of the present invention, the control signal is a PWM (pulse width modulation) signal and the compensating signal is responsive to the duty cycle D of the control signal. The compensating signal may indicate the value of the duty cycle. In one embodiment, the compensating signal arises with the increase of the duty cycle. In another embodiment, the compensating signal decreases with the increase of the duty cycle. In yet another embodiment, a linearity relationship is established between the compensating signal and the duty cycle D.

In one embodiment, the compensating signal may be a current signal. The compensating signal is coupled into the first current signal $I_{FIRST}$. The compensating signal may be a positive signal or a negative signal, and may be a sinking current or a sourcing current. The coupling method may comprise, without limitation, directly or indirectly adding, subtracting, multiplying, dividing, integrating, differentiating, or the above operations with amplifying or level shifting.

According to one embodiment of the present invention, the current compensating circuit 601 shown in FIG. 6 comprises: a first low-pass filter 603, having an input terminal and an output terminal, wherein the input terminal is coupled to the hysteresis voltage generating node B; a first amplifier 604, having a first input terminal, a second input terminal and an output terminal, wherein the first input terminal is coupled to hysteresis voltage generating node B, and wherein the second input terminal is coupled to the first reference voltage REF, and further wherein the output terminal generates the compensating signal 602. In one embodiment, the first amplifier may be a transconductance amplifier.

Figure 8:
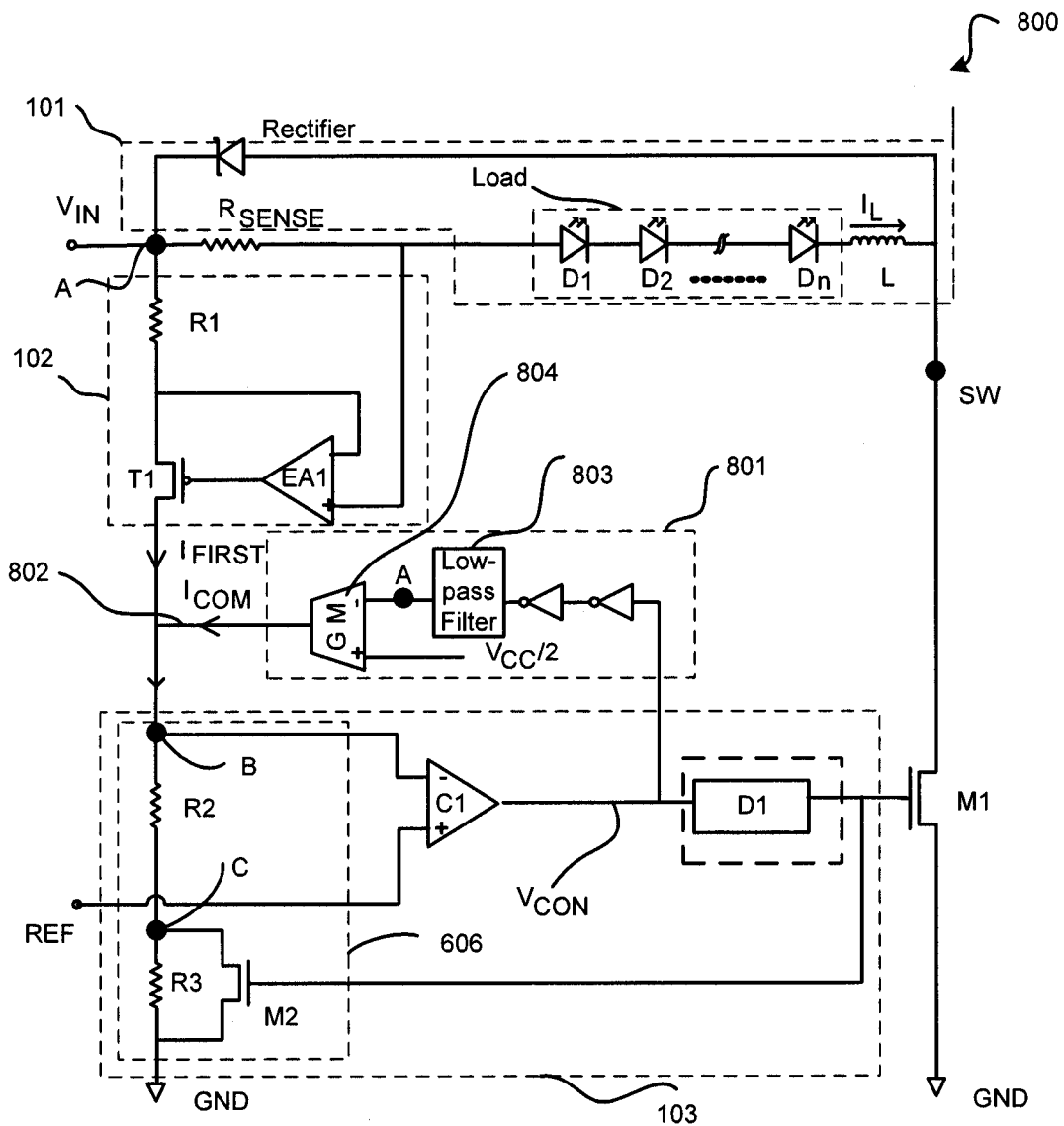
FIG. 8 illustrates a specific circuitry diagram of a current control circuit system 800 according to another embodiment of the present invention.
Figure 9:
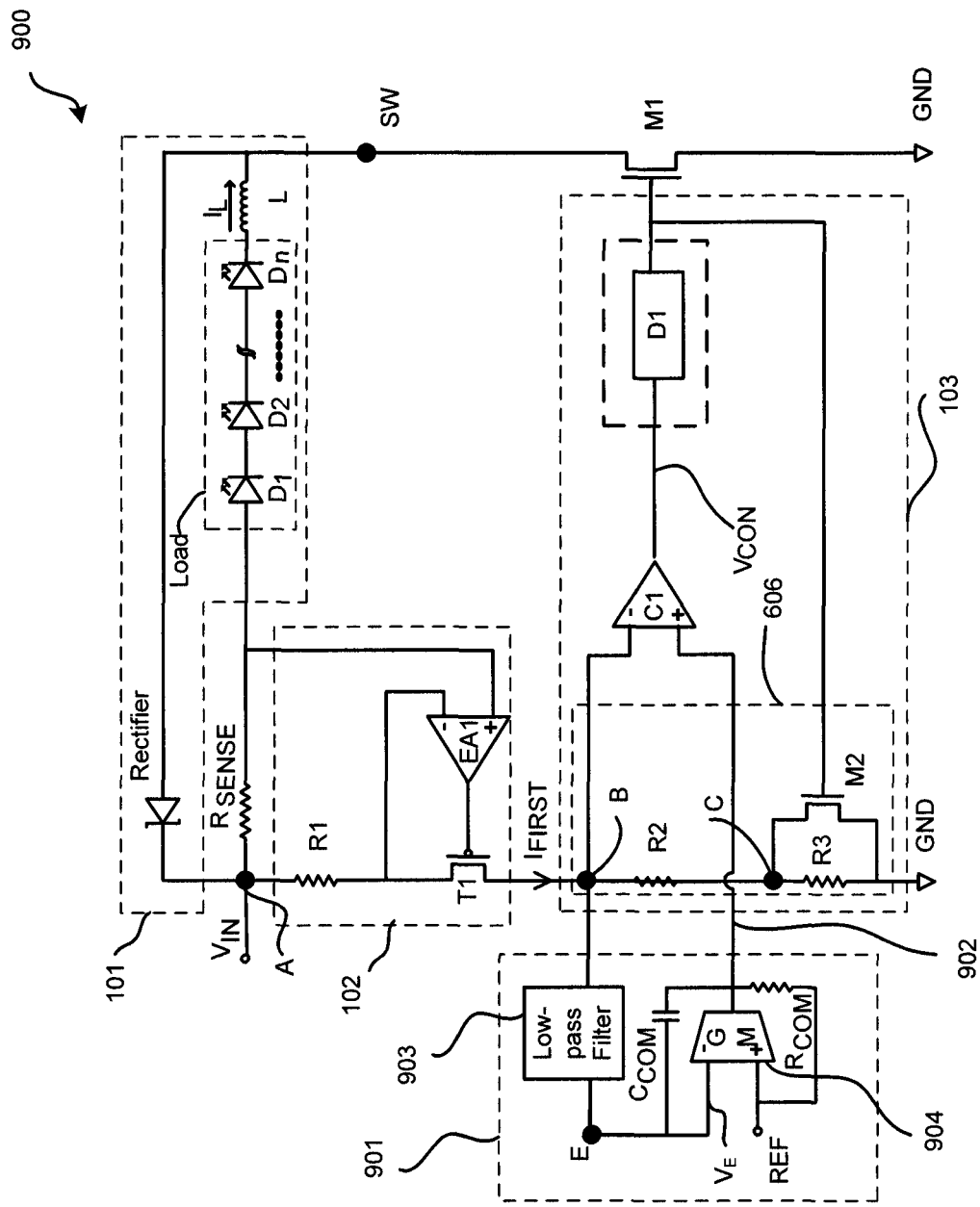
FIG. 9 illustrates a specific circuitry diagram of a current control circuit system 900 according to yet another embodiment of the present invention.

According to another embodiment, the current compensating circuit 801 shown in FIG. 8 may alternatively comprise: a second reference voltage $V_{CC}/2$; a low-pass filter 803; a first amplifier 804, having a first input terminal, a second input terminal and an output terminal, wherein the first input terminal is coupled to the output of the control circuit 103 through the low-pass filter 803, and wherein a second input terminal is coupled to the second reference voltage $V_{CC}/2$, wherein the second reference voltage $V_{CC}/2$ equals half of the high level voltage of the control signal $V_{CON}$, and further wherein the output terminal generates the compensating signal. In one embodiment, the first amplifier is a transconductance amplifier.

In yet another embodiment, the second input terminal of the first comparator C1 is coupled to the compensating signal. A compensating circuit 901 shown in FIG. 9 comprises: a low-pass filter 903; a first amplifier 904, having a first input terminal, a second input terminal and an output terminal, wherein a first input terminal is coupled to the control circuit 103 through the third low-pass filter 903, and wherein a second input terminal is coupled to the first reference signal REF. In the illustrated embodiment, the first amplifier is a transconductance amplifier. The compensating circuit 901 further comprises a fourth resistor $R_{COM}$, coupled between the first reference signal REF and the output terminal of the first amplifier 904; and a first capacitor $C_{COM}$, coupled between the first input terminal and the output terminal of the first amplifier 904.

In some other embodiments, the compensating signal is coupled with the first reference signal. The coupling method may comprise, without limitation, directly or indirectly adding, subtracting multiplying, dividing, integrating, differentiating, or the above operations with amplifying or level shifting.

Figure 5:
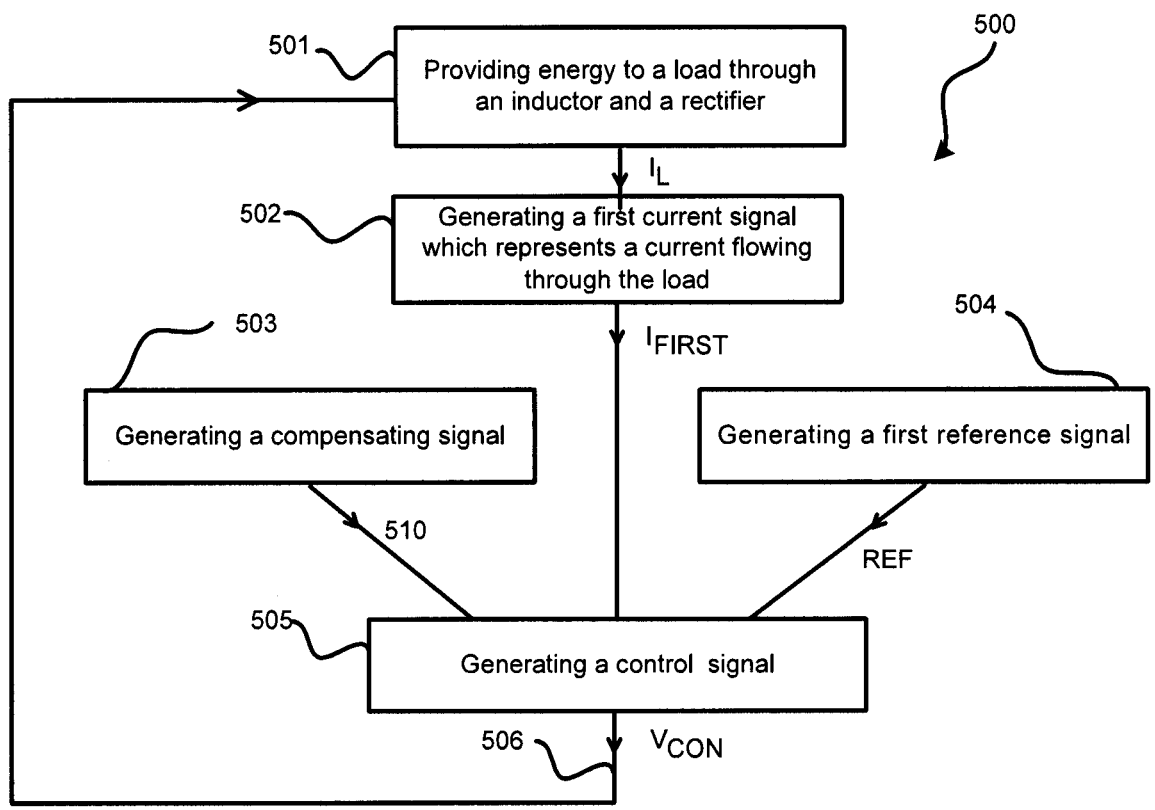
FIG. 5 illustrates an operation process flow diagram of the current control circuit system 400 according to an embodiment of the present invention.

FIG. 5 illustrates a process flow chart 500 of a current control method according to an embodiment of the present invention. Process flow chart 500 comprising: step 501, providing energy to a load by an inductor, a rectifier and a switch; step 502, generating a first current signal $I_{FIRST}$ to represent the load current or the inductor current; step 503, generating a compensating signal 510 by a compensating circuit; step 504, providing a first reference signal REF; step 505, generating a control signal $V_{CON}$ according to the first current signal $I_{FIRST}$ and the compensating signal 510. In certain embodiment, generating the control signal $V_{CON}$ may be also according the first reference signal REF. The process flow further comprises a step 506, applying the control signal $V_{CON}$ to control the switch ON and OFF. It should be noted that steps 501-506 are the description sequence in the text hereby, and do not represent the operation sequence of the embodiment of the present invention.

In one embodiment, the load mentioned in process flow chart 500 may be LED. The load may comprise one or more LEDs, or one or more strings of LED. The type of LED may comprise but not limited to white LED, blue LED, red LED, yellow LED, and etc. In another embodiment, the load may further comprise but not limited to battery, electric load, and etc.

In one embodiment, the rectifier mentioned in process flow chart 500 may comprise a Schottky diode. In other embodiments, P-type or N-type metal-oxide semiconductor field effect transistor (MOSFET) may be applied into the rectifier.

In one embodiment, the control method further comprises providing an input voltage terminal $V_{IN}$ and a switch terminal SW. The load and the inductor L are coupled in series, and then together coupled between the input voltage terminal $V_{IN}$ and the switch terminal SW. The rectifier Rectifier is coupled between the input voltage terminal $V_{IN}$ and the switch terminal SW. In one embodiment, the inductor L is adjacent to switch terminal SW while in another embodiment, the load is adjacent to switch terminal SW. In other embodiments, the inductor L is coupled in certain positions among the LED strings. The rectifier, the load and the inductor may be coupled directly, or indirectly coupled through other device, wire, and etc.

In one embodiment, the current control method further comprises applying a sampling resistor $R_{SENSE}$ (FIG. 6)

coupled to the load or inductor in series. The sampling resistor $R_{SENSE}$ may be adjacent to the input voltage terminal $V_{IN}$, or adjacent to the switch terminal SW. The sampling resistor $R_{SENSE}$ may be coupled among the loads, or coupled between the load and the inductor. The current sense circuit 102 detects the current flowing through the load by the sampling resistor $R_{SENSE}$. In one embodiment, the sampling resistor $R_{SENSE}$ comprises a first terminal and a second terminal; The current sense circuit 102 comprises: a first resistor R1, comprising a first terminal and a second terminal, wherein the first terminal is coupled to the first terminal of the sampling resistor $R_{SENSE}$; a first error amplifier EA1, wherein a first input terminal is coupled to the second terminal of the first resistor R1, and wherein a second input terminal is coupled to a second terminal of the sampling resistor $R_{SENSE}$; a first transistor T1, wherein a gate is coupled to an output terminal of the first error amplifier EA1, and wherein a first input terminal is coupled to the second terminal of the first resistor, and further wherein a second input terminal is coupled to the control circuit 103.

According to one embodiment of the present invention, generating the control signal comprises: generating hysteresis voltage by a hysteresis generator; comparing hysteresis voltage with the first reference signal REF and generating the control signal $V_{CON}$ accordingly. In certain embodiments, the control signal $V_{CON}$ may further be converted to a driving signal. In one embodiment, the hysteresis generator comprises a second resistor R2; a third resistor R3, coupled to the second resistor R2; a second switch M2, coupled to the third resistor R3 in parallel, and controlled by the control signal $V_{CON}$.

According to one embodiment, the control signal may be a PWM signal and thus generating the compensating signal 510 may be based on the duty cycle of the control signal $V_{CON}$. The compensating signal 510 is responsive to the duty cycle signal. The compensating signal may reflect the value of the duty cycle. In other embodiment, the compensating signal 510 increases as the duty cycle increases. In another embodiment, the compensating signal 510 increases as the duty cycle decreases. In yet another embodiment, a linear relationship is established between the compensating signal 510 and the duty cycle.

In one embodiment, the compensating signal may be a current signal. The method further comprises coupling the compensating signal into the first current signal $I_{FIRST}$. The current control signal may be a positive signal or a negative signal, and may be a sinking current or a sourcing current. The coupling method may comprise, without limitation, directly or indirectly adding, subtracting multiplying, dividing, integrating, differentiating, or the above operations with amplifying or level shifting.

In one embodiment, generating the compensating signal comprises: filtering the first current signal $I_{FIRST}$; sending the filtered first current signal and the first reference signal REF to a first amplifier; and generating the compensating signal accordingly by the first amplifier.

According to another embodiment, generating the compensating signal may alternatively comprises: filtering the control signal $V_{CON}$; sending the filtered control signal and a second reference signal $V_{CC}/2$ to a first amplifier, wherein the second reference signal $V_{CC}/2$ equals half of the high voltage level of the control signal $V_{CON}$; and generating the compensating signal accordingly by the first amplifier.

In another one embodiment, generating the control signal $V_{CON}$ may alternatively comprises: generating a hysteresis voltage through a hysteresis generator according to the first current signal $I_{FIRST}$; and comparing the hysteresis voltage with the compensating signal and generating the control signal accordingly.

In one embodiment, generating the compensating signal comprises: filtering the first current signal $I_{FIRST}$; sending the filtered first current signal and the first reference signal REF to a first amplifier to make the first amplifier sink or source current; and generating the compensating signal accordingly by the first amplifier. In one embodiment, the first amplifier may be a transconductance amplifier.

In yet another embodiment, the compensating signal is coupled with the first reference signal. The coupling method may comprise, without limitation, directly or indirectly adding, subtracting multiplying, dividing, integrating, differentiating, or the above operations with amplifying or level shifting.

FIG. 6 illustrates a specific schematic circuit of a circuit system 600 according to an embodiment of the present invention. Circuit system 600 comprises: an input voltage terminal $V_{IN}$, a switch terminal SW and a reference ground terminal GND. In the illustrated embodiment, the input voltage terminal $V_{IN}$ is coupled to a power supply and the terminal GND is connected to the reference ground. However, in other embodiments, the terminal GND may be coupled to a negative power supply. Or each of the terminals $V_{IN}$, SW and GND may apply one or more ports, pads, or pins.

A fly-wheel circuit 101 comprises an inductor L, a load and a rectifier Rectifier. In the illustrated embodiment, the load comprises a LED string $D_1$-$D_N$ (n is an integrate number larger than 1). In other embodiment, the load may comprise a plurality of LED strings with equivalent or nonequivalent numbers of LEDs for each LED string. AS shown in FIG. 6, the rectifier comprises a Schottky diode. However, in other embodiments, the rectifier comprises a synchronous switch. The synchronous switch may comprise N-type MOSFET (NMOS), P-type MOSFET(PMOS) or insulated gate bipolar transistor (IGBT). Correspondingly, a complementary or synchronous signal of the control signal $V_{CON}$ is required for the system to control the synchronous switch. Seen in FIG. 6, the load D1-DN and the inductor L are coupled in series, and then are together coupled between the input voltage terminal VIN and the switch terminal SW. The inductor L is adjacent to the switch terminal SW. Since the currents on each of the devices in a series connection circuit loop are approximately the same (ignore the affecting factors such as leakage current), in other embodiments, the load may be placed after the inductor L and adjacent to the switch terminal SW. In another embodiment, the inductor may be placed at certain positions among the LEDs in a LED string. Other suitable devices may also be coupled between the switch terminal SW and an output terminal, for an instance, coupling a PMOS with a low on-state resistance between the input voltage terminal $V_{IN}$ and a node A, or before the LED strings. When the system is idle, the PMOS is turned OFF, so that the whole system is off-insulated without leakage current. While the system is operating, the PMOS is turned on. Because of the low on-state resistance of the PMOS, the power loss is limited and does not affect the normal operation of the system. The rectifier is coupled between the input voltage terminal $V_{IN}$ and the switch terminal SW. In other embodiments, the rectifier may be coupled between the input voltage terminal $V_{IN}$ and the switch terminal SW through other switches, sampling resistors or hall-effect devices. It should be noted that the connection relationship shown in FIG. 6 is illustrative. In other embodiments, the rectifier, the inductor and the load may be coupled between the switch terminal SW and the reference ground terminal GND, and the switch may be coupled between the input voltage terminal $V_{IN}$ and the switch terminal SW to form a buck converter structure. In yet other embodiments, the inductor, the load, the rectifier and the switch may form a boost, a buck-boost, a fly-back or other suitable structure, which are included in the scope of the present invention.

Current sense circuit 102 senses the current flowing through the load and is configured to generate a first current signal $I_{FIRST}$. The circuit system 600 further comprises a sampling resistor $R_{SENSE}$, coupled between node A and the load. The resistance scope of $R_{SENSE}$ may be from 0.01 ohmic to several ohmic. It should understand that this resistance value range is for illustration without limitation. Similarly, since the current in a series connected circuit loop is substantially the same, the sampling resistor $R_{SENSE}$ may be coupled among the LEDs in LED string, or between the LED string and the inductor, or after the inductor. In other embodiment, the sampling resistor $R_{SENSE}$ may be omitted, and the current on the load or inductor is directly detected. In another embodiment, the current sense circuit 102 detects the voltage difference between the input voltage terminal $V_{IN}$ and the switch terminal SW, or between node A and the terminal SW. Thus the sensed current may generate a sensed current signal is responsive to the load current or the inductor current and representing the change of the load current. Once the generated signal has a logic relationship with the load current or inductor current, it should be considered as a current sampling signal. Shown in FIG. 6, the current sense circuit comprises: the sampling resistor $R_{SENSE}$, having a first terminal and a second terminal, wherein the first terminal is coupled to node A, and wherein the second terminal is coupled to the load; a first resistor R1, having a first terminal and a second terminal, wherein the first terminal is coupled to the first terminal of the sampling resistor $R_{SENSE}$; a first error amplifier EA1, wherein an first input terminal is coupled to the second terminal of the first resistor, and wherein the second input terminal is coupled to the second terminal of the sampling resistor $R_{SENSE}$; a first transistor T1, wherein a gate terminal is coupled to an output terminal of the first error amplifier EA1, and wherein a source terminal is coupled to the second terminal of the first resistor R1, and further wherein a drain terminal is coupled to the control circuit 103.

Due to the negative feedback effect of the amplifier, the voltage level on the second terminal of the first resistor and the second terminal of the sampling resistor are maintained the same. Therefore the voltage drops on the two resistors are equal, $$I_{FIRST} \times R1 = I_{RSENSE} \times R_{SENSE} \quad (1)$$

$$I_{FIRST} = I_{RSENSE} \times R_{SENSE}/R1 \quad (2)$$

Wherein, $I_{FIRST}$ is the current flowing through the first resistor R1, and $I_{RSENSE}$ is the current flowing through the sampling resistor $R_{SENSE}$. In the illustrated embodiment shown in FIG. 6, $I_{RSENSE}$ equals the inductor current $I_L$ and the load current. Generally, R1 may be integrated in an integrated circuit (IC) chip, and $R_{SENSE}$ is an external device. By choosing different values of $R_{SENSE}$, the load current is chosen. As the amplifier is not an ideal amplifier, the voltage level on the second terminal of the first resistor R1 and the second terminal of the sampling resistor $R_{SENSE}$ may not be absolutely the same. Consequently an error voltage $\Delta$ may be generated. The error voltage $\Delta$ may be actively set according to the requirement, so as to make $$I_{FIRST} = I_{RSENSE} \times R_{SENSE}/R1 \times \Delta/R1 \quad (3)$$

Wherein, $\Delta/R1$ is a direct current (DC) component, which represents that the first current $I_{FIRST}$ has an initial current value.

For better explaining the present invention, it is assumed in the following analysis that $$I_{FIRST} = K \times I_{SENSE} \quad (4)$$

Wherein, K may be a constant number or a function. For example, in the illustrated embodiment, $K = R_{SENSE}/R1$.

A compensating circuit 601 generates a compensating signal 602. In one embodiment, the compensating circuit 601 comprises: a low-pass filter 603; a first amplifier 604, having a first input terminal, a second input terminal and an output terminal, wherein the first input terminal is coupled to a hysteresis voltage generating node B of control circuit 103 through the low-pass filter 603, and wherein the second input terminal is coupled to a first reference voltage REF, and further wherein the output terminal generates the compensating signal 602. In the illustrated embodiment, the compensating signal 602 is a current signal. However in other embodiments, the compensating signal 602 may be a voltage signal. The compensating signal 602 is coupled to the first current signal IFIRST. The term "couple" hereby may indicate the two signals may be combined through one or more of following method: adding, subtracting, multiplying, dividing, integrating, differentiating, or amplifying, abstracting, algebraic manipulating one or two of the signals before the above operation. The current control signal may be a positive signal or a negative signal, and may be a sinking current or a sourcing current. In one embodiment, a transconductance amplifier may be applied as the first amplifier.

Circuit system 600 comprises a first reference signal REF. In one embodiment, REF may be a reference current or voltage with low thermal drift. In another embodiment, REF may be a current or a voltage proportional to absolute temperature (PTAT). In yet another embodiment, REF may be a current or a voltage inverse proportional to absolute temperature (IPTAT). For better understanding, it is assumed that REF is a voltage signal in the following analysis.

Control circuit 103 generates the control signal $V_{CON}$ according to the first current signal $I_{FIRST}$, the compensating signal 602 and the first signal REF. In one embodiment, control circuit 103 comprises a hysteresis generator 606 which generates a hysteresis voltage, wherein the hysteresis voltage has a high level peak voltage $V_{B1}$ and a low level peak voltage $V_{B2}$. The hysteresis generator 606 comprises: a second resistor R2, coupled between two hysteresis generating nodes B and C; a third resistor R3, coupled between node C and the reference ground terminal GND; and a second switch M2, coupled to the third resistor R3 in parallel and controlled by the control signal $V_{CON}$. In one embodiment, the second switch M2 may be an NMOS. Since the on-state resistance of the NMOS is much lower than the third resistor R3, it may be considered that the voltage level on node C is at ground level.

A first comparator C1 has a first input terminal coupled to the hysteresis generator 606. In one embodiment, the first input terminal is coupled to node B, configured to change the voltage level of the control signal $V_{CON}$. A second input terminal of the first comparator C1 is coupled to the first reference signal REF. An output terminal of the first comparator C1 generates the control signal $V_{CON}$. A driver D1 may be further coupled to an output terminal of the first comparator C1, configured to convert the control signal $V_{CON}$ to a driving signal.

Once the control circuit 103 is operating normally, when the control signal $V_{CON}$ is at high level, the current on the load increases gradually, and the voltage level of node B also increases gradually. At this moment, since the second switch M2 is turned on, the voltage level of node C is at ground level. When the voltage level of node B reaches $V_{REF}$ (the voltage level of the first reference signal REF), the comparator C1 generates a low level signal to turn M1 and M2 off. The compensating current $I_{COM}$ and the first current signal $I_{FIRST}$ are coupled together and then flows through the second resistor R2. When the comparator is inversed, supposing that the value of the inductor current $I_{SENSE}$ is $I_{TH1}$, then $$(I_{COM}-K\times I_{TH1})\times R2 = V_{REF} \quad (5)$$

According to formula (5), $$I_{TH1} = (V_{REF}/R2 - I_{COM})/K \quad (6)$$

Figure 7:
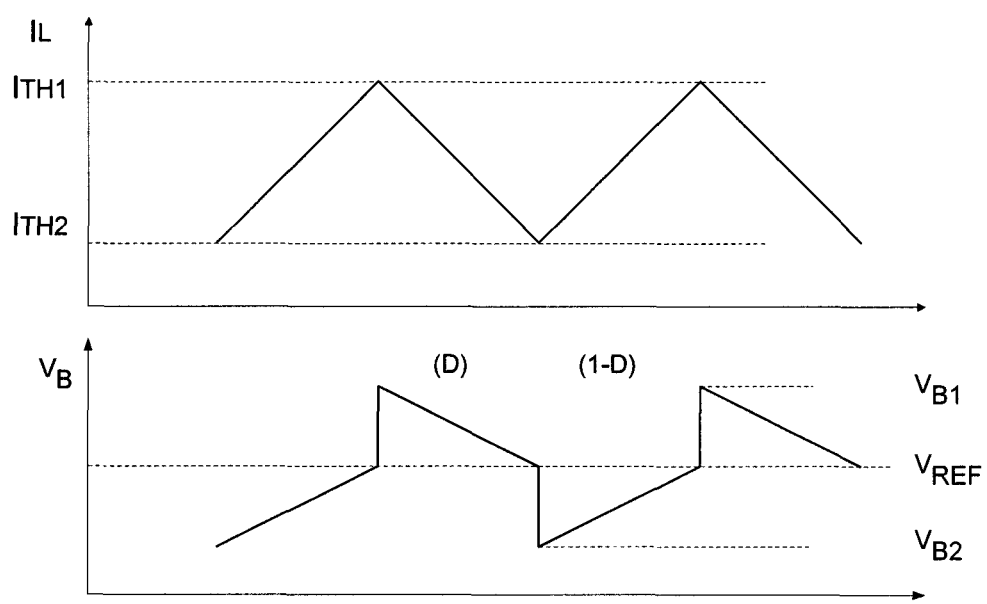
FIG. 7 illustrates an operation waveform diagram of the current control circuit system 600 according to an embodiment of the present invention

As shown in FIG. 7, once the second switch M2 is suddenly turned off, because the current flows through the third resistor R3, the voltage level of node C steps up, and the voltage level of node B increases to the high level peak voltage $V_{B1}$, $$V_{B1} = (R3+R2)\times V_{REF}/R2 \quad (7)$$

The variance $\Delta V_{B1}$ of the voltage level of node B is $$\Delta V_{B1} = V_B - V_{REF} = R3 \times V_{REF}/R2 \quad (8)$$

Once the voltage level of node B steps up, the control signal $V_{CON}$ is maintained at low level. As the first switch M1 is turned off, the current flows along the loop of the load, the inductor L, and the rectifier Rectifier. The inductor current $I_{SENSE}$ continuously decreases, and the first current signal $I_{FIRST}$ also continuously decreases. Thus the voltage level of node B falls down. When the voltage level of node B falls to the $V_{REF}$, the comparator C1 is inversed and generates a high level signal. The switches M1 and M2 are turned on again. At this moment, the compensating current $I_{COM}$ and the first current signal $I_{FIRST}$ are coupling together and then flow through the second resistor R2 and the third resistor R3. Supposing when the comparator C1 is inversed, the value of inductor current $I_{SENSE}$ is $I_{TH2}$, then, $$(I_{COM}+K\times I_{TH2})\times (R3+R2) = V_{REF} \quad (9)$$

According to formula (9), $$I_{TH2} = (V_{REF}/(R3+R2) - I_{COM})/K \quad (10)$$

Once the second switch M2 suddenly is turned on, because the current flows through M2, the voltage level of node B steps down to the low level peak voltage $V_{B2}$, where $$V_{B2} = R2 \times V_{REF}/(R3+R2) \quad (11)$$

The variance $\Delta V_{B2}$ of the voltage level of node B is $$\Delta V_{B2} = V_{REF} - V_{B2} = R3 \times V_{REF}/(R3+R2) \quad (12)$$

The average voltage value $/V_B$ of node B is $$/V_B = V_{REF} \times [1+\Delta V_{B1} \times (1-D)/2 - \Delta V_{B2} \times D/2] \quad (13)$$

Wherein, D is the duty cycle. The function of the third resistor R3 is to provide a hysteresis voltage, and in one embodiment, R2>>R3 and thus $\Delta V_{B1} \approx \Delta V_{B2}$. Therefore, when the duty cycle D is lower than 50%, the average voltage value $/V_B$ of node B is lower than $V_{REF}$. In one embodiment, if the influence of R3 is ignored, and $\Delta V_{B1} > \Delta V_{B2}$ is strictly complied, then $$\Delta V_{B1} \times (1-D_{EXACT}) - V_{B2} \times D_{EXACT} = 0 \quad (14)$$

that is, $$D_{EXACT} = \Delta V_{B1}/(\Delta V_{B1}+\Delta V_{B2}) = (R3+R2)/(R3+2\times R2) \quad (15)$$

At this moment, the compensating signal $I_{COM}$ generated by the compensating circuit 601 is zero. When the duty cycle D is lower than $D_{EXACT}$, the average voltage value $/V_B$ of node B is larger than voltage $V_{REF}$. When the duty cycle D is larger than $D_{EXACT}$, the average voltage value $/V_B$ of node B is smaller than voltage $V_{REF}$.

In certain embodiments, a low-pass filter 603 is applied to output the average voltage value of node B to a node D. In one embodiment, the sourcing current from the amplifier 604 to the control circuit 103 is defined as positive current, and the sinking current which the amplifier 604 sinks from node B is defined as negative current. In the illustrated embodiment, the first amplifier 604 is a transconductance amplifier. A positive input terminal of the transconductance amplifier 604 is coupled to the first reference signal REF, and a negative input terminal is coupled to node D. Thus the generated current control signal $I_{COM}$ $$I_{COM} = G_M \times (/V_B - V_{REF}) \quad (16)$$

Wherein, $G_M$ is the transconductance of the transconductance amplifier, which represents the capability of transmitting the differential voltage of the two input terminals to current signal.

According to above analysis, it may be concluded that, when the duty-cycle is lower than 50%, the average voltage $/V_B$ of node B may be larger than reference voltage $V_{REF}$. As $I_{COM}$ is a positive signal, the current flows into the control circuit through node B. When the duty cycle is larger than 50%, the average voltage $/V_B$ of node B is smaller than $V_{REF}$. As a result $I_{COM}$ is a negative signal and the amplifier sinks current from node B.

According to formula (6) and (10), the average load or inductor current $/I_{SENSE}$ is:

$$/I_{SENSE} = (I_{TH1}+I_{TH2})/2 = (REF/(R3+R2)+REF/R2 - 2\times I_{COM})/K/2 \quad (17)$$

When the duty cycle is lower than 50%, $I_{COM}$ is a positive signal, and $/I_{SENSE}$ decreases. When the duty cycle is larger than 50%, $I_{COM}$ is a negative signal and $/I_{SENSE}$ increase. As a result, the drift error of the average inductor current $/I_L$ described above is prohibited.

A first switch M1 is coupled between the switch terminal SW and the reference ground terminal GND, turned ON and OFF according to the control signal $V_{CON}$. In one embodiment, NMOS or IGBT may be applied as the first switch M1. In the illustrated embodiment, the control terminals of the switches M1 and M2 are together coupled to the output of the driver D1. In other embodiments, the control terminals of the two switches may be coupled to different terminals. For example, the control terminal of the switch M2 may be coupled to the control signal directly without the driver.

FIG. 8 illustrates a circuit system 800 according to another embodiment of the present invention. Seen in FIG. 8, compared with circuit system 600, an alternative compensating circuit 801 replaces compensating circuit 601, configured to generate a compensating signal 802. In one embodiment, compensating circuit 801 comprises a low-pass filter 803 and a first amplifier 804 comprising a first input terminal, a second input terminal and an output terminal. Wherein the first input terminal is coupled to the output terminal of the first capacitor C1 through the low-pass filter 803, and wherein the second input terminal is coupled to a second reference voltage $V_{CC}/2$, wherein $V_{CC}$ is the internal power supply voltage which equals the high level signal of comparator or inverter output, and the output terminal provides the compensating signal $I_{COM}$. In the illustrated embodiment, the first amplifier 804 is a transconductance amplifier.

The operation process flow of circuit system is described in the following text. When the output of the comparator C1 passes through the low-pass filter 803, if the duty cycle is smaller than 50%, the voltage on the negative input terminal of the comparator C1 is smaller than $V_{CC}/2$. The transconductance amplifier 804 sources current to node B, that is, $I_{COM}$ is a positive current signal. According to formula (17), the average load or inductor current /$I_{SENSE}$ decreases. When the duty cycle is larger than 50%, $I_{COM}$ is a negative current signal, and /$I_{SENSE}$ increases. As a result, the drift error of the average current /$I_L$ described above is prohibited.

FIG. 9 illustrates a circuit system 900 according to yet another embodiment of the present invention. Seen in FIG. 9, compared with circuit system 600, an alternative compensating circuit 901 replaces compensating circuit 601, configured to generate a compensating signal 902. $V_{902}$ represent the voltage level of compensating signal 902. In one embodiment, compensating circuit 901 comprises a low-pass filter 903 and a first amplifier 904. The first amplifier 904 has a first input terminal, a second input terminal and an output terminal, wherein the first input terminal is coupled to the output terminal of the first capacitor C1 through the low-pass filter 903, and wherein the second input terminal is coupled to the first reference voltage REF; a fourth resistor $R_{COM}$, coupled between the first reference signal REF and an output terminal of the first amplifier 904; a first capacitor $C_{COM}$, coupled between the first input terminal and the output terminal of the first amplifier 904. The output terminal of amplifier 904 provides a compensating signal. In the illustrated embodiment, first amplifier 904 is a transconductance amplifier.

The operation process flow of circuit system 900 is described in the following text. Similar to the circuit system 600, according to formula (13), when the duty cycle is smaller than 50%, the average voltage /$V_B$ of node B is larger than the reference voltage $V_{REF}$, that is, the voltage $V_E$ of node E is larger than $V_{REF}$. The transconductance amplifier 904 sinks current, and the voltage level $V_{902}$ of compensating signal 902 decreases. While the duty cycle is larger than 50%, the average voltage /$V_B$ of node B is smaller than the reference voltage $V_{REF}$, and the voltage level $V_{902}$ increases.

According to formula (6) and (10), if $I_{COM}$ is set to zero, and if $V_{902}$ replaces $V_{REF}$, then the high level peak voltage $I_{TH3}$ and low level peak voltage $I_{TH4}$ is $$I_{TH3}=V_{902}/R2/K \quad (18)$$

$$I_{TH4}=V_{902}/(R3+R2)/K \quad (19)$$

Therefore, the average load or inductor current /$I_L$3 is $$/I_{L3}=(I_{TH1}+I_{TH2})/2=[V_{902}/(R3+R2)+V_{902}/R2]/K/2$$

When the duty cycle is smaller than 50%, $V_{902}$ decreases so that $I_{L3}$ decreases. When the duty cycle is larger than 50%, $V_{902}$ increases so that $I_{L3}$ increases. As a result, the drift error of the average current /$I_L$ described above is prohibited.

The present invention introduces a compensating circuit into circuit system, configured to provide a precise load current. The compensating circuit is not limited by the above embodiments. In other embodiments, other suitable circuit structure may also be applied as compensating circuit.

Similarly, the above embodiments are primary illustrative practiced for the issue of duty cycle. However, other embodiments may be practiced for the issue of propagation delay of circuit. For an instance, a current sense circuit may have a large propagation delay at low current, and a small propagation delay at high current. The compensating circuit may detect a signal which indicates the current and compensate the control circuit loop. These applications also are included in the scope of the present invention.

The above description and discussion about specific embodiments of the present invention is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

I claim:

1. A current control circuit system, comprising:
a first switch, comprising a first terminal, a second terminal and a control terminal, wherein the second terminal is coupled to a reference ground terminal;
a fly-wheel circuit comprising an inductor having a first terminal and a second terminal, a rectifier having a first terminal and second terminal, and a load having a first terminal and a second terminal, wherein the first terminal of the load is coupled to an input voltage terminal and the second terminal of the load is coupled to the first terminal of the inductor, and wherein the second terminal of the inductor is coupled to the first terminal of the switch, and further wherein the first terminal of the rectifier is coupled to the input voltage terminal, and the second terminal of the rectifier is coupled to the first terminal of the switch;
a current sense circuit having an input terminal and an output terminal, wherein the input terminal is coupled to the fly-wheel circuit and wherein the output terminal is configured to provide a first current signal indicating a load current flowing through the load;
a compensating circuit having an output terminal configured to provide a compensating signal;
a control circuit, having a plurality of input terminals and an output terminal, wherein the input terminals are at least coupled to the output terminal of the current sense circuit and the output terminal of the compensating circuit, and the output terminal of the control circuit is coupled to the control terminal of the first switch, configured to provide a control signal according to the first current signal and the compensating signal to turn the first switch ON and OFF;
a hysteresis generator having a hysteresis voltage generating node coupled to the output terminal of the current sense circuit to receive the first current signal, wherein the hysteresis voltage generating node is configured to provide a hysteresis voltage; and
a first comparator, having a first input terminal, a second input terminal and an output terminal, wherein the first input terminal is coupled to the hysteresis voltage generating node, and wherein the output terminal is configured to generate the control signal;
further wherein the compensating circuit comprises:
a low-pass filter having an input terminal and an output terminal, wherein the input terminal is coupled to the hysteresis voltage generating node; and
a first amplifier, having a first input terminal, a second input terminal and an output terminal, wherein the first input terminal is coupled to the output terminal of the low-pass filter, and wherein the second input terminal is coupled to the first reference voltage, and further wherein the output terminal is configured to provide the compensating signal.

2. The current control circuit system according to claim 1, further comprising a sampling resistor, wherein the sampling resistor having a first terminal and a second terminal, wherein the first terminal of the sampling resistor is coupled to the input voltage terminal, and the second terminal of the sampling resistor is coupled to the first terminal of the load, and further wherein the current sense circuit is configured to detect the load current through the sampling resistor.

3. The current control circuit system according to claim 1, wherein the control signal is a PWM signal.

4. The current control circuit system according to claim 1, further comprising a driver circuit, wherein the driver circuit is coupled between the output terminal of the first comparator and the control terminal of the first switch, and wherein the driver circuit is configured to convert the control signal to a driving signal to drive the first switch.

5. The current control circuit system according to claim 1, wherein the hysteresis generator comprises:
- a second resistor having a first terminal and a second terminal, wherein the first terminal functions as the hysteresis voltage generating node;
- a third resistor, coupled between the second terminal of the second resistor and the reference ground; and
- a second switch, coupled with the third resistor in parallel, and wherein the second switch has a control terminal coupled to the control signal.

6. The current control circuit system according to claim 1, wherein the compensating signal is coupled into the first current signal, and wherein the second input terminal of the first comparator is coupled to a first reference signal.

7. A current control circuit system, comprising:
- a first switch, comprising a first terminal, a second terminal and a control terminal, wherein the second terminal is coupled to a reference ground terminal;
- a fly-wheel circuit comprising an inductor having a first terminal and a second terminal, a rectifier having a first terminal and second terminal, and a load having a first terminal and a second terminal, wherein the first terminal of the load is coupled to an input voltage terminal and the second terminal of the load is coupled to the first terminal of the inductor, and wherein the second terminal of the inductor is coupled to the first terminal of the switch, and further wherein the first terminal of the rectifier is coupled to the input voltage terminal, and the second terminal of the rectifier is coupled to the first terminal of the switch;
- a current sense circuit having an input terminal and an output terminal, wherein the input terminal is coupled to the fly-wheel circuit and wherein the output terminal is configured to provide a first current signal indicating a load current flowing through the load;
- a compensating circuit having an output terminal configured to provide a compensating signal;
- a control circuit, having a plurality of input terminals and an output terminal, wherein the input terminals are at least coupled to the output terminal of the current sense circuit and the output terminal of the compensating circuit, and the output terminal of the control circuit is coupled to the control terminal of the first switch, configured to provide a control signal according to the first current signal and the compensating signal to turn the first switch ON and OFF;
- a hysteresis generator having a hysteresis voltage generating node coupled to the output terminal of the current sense circuit to receive the first current signal, wherein the hysteresis voltage generating node is configured to provide a hysteresis voltage; and
- a first comparator, having a first input terminal, a second input terminal and an output terminal, wherein the first input terminal is coupled to the hysteresis voltage generating node, and wherein the output terminal is configured to generate the control signal;
- wherein the compensating circuit comprises:
- a low-pass filter having an input terminal and an output terminal, wherein the input terminal is coupled to the hysteresis voltage generating node; and
- a first amplifier, having a first input terminal, a second input terminal and an output terminal, wherein the first input terminal is coupled to the output terminal of the low-pass filter, and wherein the second input terminal is coupled to the first reference voltage, and further wherein the second reference voltage is half the level of the high level of the control signal, and further wherein the output terminal generated the compensating signal.

8. The current control circuit system according to claim 7, wherein the second input terminal of the first comparator is coupled to the compensating signal.

9. A current control circuit system, comprising:
- a first switch, comprising a first terminal, a second terminal and a control terminal, wherein the second terminal is coupled to a reference ground terminal;
- a fly-wheel circuit comprising an inductor having a first terminal and a second terminal, a rectifier having a first terminal and second terminal, and a load having a first terminal and a second terminal, wherein the first terminal of the load is coupled to an input voltage terminal and the second terminal of the load is coupled to the first terminal of the inductor, and wherein the second terminal of the inductor is coupled to the first terminal of the switch, and further wherein the first terminal of the rectifier is coupled to the input voltage terminal, and the second terminal of the rectifier is coupled to the first terminal of the switch;
- a current sense circuit having an input terminal and an output terminal, wherein the input terminal is coupled to the fly-wheel circuit and wherein the output terminal is configured to provide a first current signal indicating a load current flowing through the load;
- a compensating circuit having an output terminal configured to provide a compensating signal;
- a control circuit, having a plurality of input terminals and an output terminal, wherein the input terminals are at least coupled to the output terminal of the current sense circuit and the output terminal of the compensating circuit, and the output terminal of the control circuit is coupled to the control terminal of the first switch, configured to provide a control signal according to the first current signal and the compensating signal to turn the first switch ON and OFF;
- a hysteresis generator having a hysteresis voltage generating node coupled to the output terminal of the current sense circuit to receive the first current signal, wherein the hysteresis voltage generating node is configured to provide a hysteresis voltage; and
- a first comparator, having a first input terminal, a second input terminal and an output terminal, wherein the first input terminal is coupled to the hysteresis voltage generating node, and wherein the output terminal is configured to generate the control signal; and wherein the second input terminal of the first comparator is coupled to the compensating signal;
- wherein the compensating circuit comprises:
- a low pass filter having an input terminal and an output terminal, wherein the input terminal is coupled to the hysteresis voltage generating node;
- a first amplifier, having a first input terminal, a second input terminal and an output terminal, wherein the first input terminal is coupled to the output terminal of the low-pass filter, the second input terminal is coupled to a first reference signal;

a fourth resistor, coupled between the first reference signal and the output terminal of the first amplifier; and
a first capacitor, coupled between the first input terminal of the first amplifier and the output terminal of the first amplifier;
wherein the output terminal of the first amplifier is configured to provide the compensating signal.

* * * * *